US010175397B2

(12) United States Patent
Singh et al.

(10) Patent No.: US 10,175,397 B2
(45) Date of Patent: Jan. 8, 2019

(54) OPTICAL FILM INCLUDING AN INFRARED ABSORPTION LAYER

(71) Applicant: SAINT-GOBAIN PERFORMANCE PLASTICS CORPORATION, Solon, OH (US)

(72) Inventors: Laura Jane Singh, Paris (FR); Yemima Anne Bon Saint Come, Paris (FR); Camille Joseph, Paris (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 133 days.

(21) Appl. No.: 14/853,547

(22) Filed: Sep. 14, 2015

(65) Prior Publication Data
US 2016/0077255 A1 Mar. 17, 2016

(30) Foreign Application Priority Data

Sep. 15, 2014 (FR) ...................... 14 02044

(51) Int. Cl.
G02B 5/20 (2006.01)
G02B 5/22 (2006.01)
G02B 1/16 (2015.01)
(52) U.S. Cl.
CPC ............... *G02B 5/208* (2013.01); *G02B 1/16* (2015.01); *G02B 5/22* (2013.01)
(58) Field of Classification Search
CPC . G02B 5/00; G02B 5/20; G02B 5/208; G02B 5/22; G02B 5/26; G02B 5/28; G02B 5/281; G02B 5/282; G02B 5/283; G02B 5/285; G02B 5/286; G02B 5/287; G02B 5/288; G02B 19/0042; G02B 19/009; G02B 19/0095
See application file for complete search history.

(56) References Cited

U.S. PATENT DOCUMENTS

| 5,514,454 | A | 5/1996 | Boire et al. |
| 5,618,579 | A | 4/1997 | Boire et al. |
| 5,652,046 | A | 7/1997 | Beaufays et al. |
| 5,691,044 | A | 11/1997 | Oyama et al. |

(Continued)

FOREIGN PATENT DOCUMENTS

| CN | 1474788 A | 2/2004 |
| EP | 1218307 B1 | 7/2008 |

(Continued)

OTHER PUBLICATIONS

Buonsanti et. al. "Tunable infrared absorption and visible transparency of colloidal aluminum-doped zinc oxide nanocrystals", Nanoleters, 2011, 11, 4706-4710.*

(Continued)

*Primary Examiner* — Robert E Tallman
(74) *Attorney, Agent, or Firm* — Abel Law Group, LLP; Alexander H. Plache

(57) ABSTRACT

Optically transparent and infrared absorbing films include an infrared absorbing layer including, for example, a transparent conductive oxide. The film can include an infrared absorption composite stack that can include, for example, an infrared absorption material disposed between dielectric layers. The film can synergistically improve optical and solar properties.

18 Claims, 2 Drawing Sheets

(56) References Cited

U.S. PATENT DOCUMENTS

| | | | |
|---|---|---|---|
| 5,956,175 | A | 9/1999 | Hojnowski |
| 5,960,606 | A * | 10/1999 | Dlubak ............. B32B 17/10018 |
| | | | 428/426 |
| 6,114,043 | A | 9/2000 | Joret |
| 6,218,018 | B1 | 4/2001 | McKown et al. |
| 6,355,334 | B1 | 3/2002 | Rondeau et al. |
| 6,707,610 | B1 | 3/2004 | Woodard et al. |
| 6,716,532 | B2 | 4/2004 | Neuman et al. |
| 6,852,419 | B2 | 2/2005 | Stachowiak |
| 7,241,506 | B2 | 7/2007 | Hartig |
| 7,709,095 | B2 | 5/2010 | Persoone et al. |
| 7,894,120 | B2 | 2/2011 | Valentin et al. |
| 7,910,628 | B2 | 3/2011 | Mercando et al. |
| 8,502,066 | B2 | 8/2013 | Krasnov |
| 9,354,368 | B2 | 5/2016 | Mauvernay et al. |
| 9,546,108 | B2 | 1/2017 | Rondeau et al. |
| 2002/0090507 | A1 | 7/2002 | Barth et al. |
| 2002/0192473 | A1 | 12/2002 | Gentilhomme et al. |
| 2003/0180547 | A1 | 9/2003 | Buhay et al. |
| 2004/0137234 | A1 | 7/2004 | Stachowiak |
| 2006/0141265 | A1 | 6/2006 | Russo et al. |
| 2006/0154049 | A1 | 7/2006 | Padiyath et al. |
| 2007/0036989 | A1 | 2/2007 | Medwick et al. |
| 2009/0237782 | A1 * | 9/2009 | Takamatsu ............. B32B 17/10 |
| | | | 359/359 |
| 2010/0062242 | A1 | 3/2010 | De Meyer et al. |
| 2012/0177899 | A1 | 7/2012 | Unquera et al. |
| 2013/0155496 | A1 * | 6/2013 | Mauvernay ......... C03C 17/3435 |
| | | | 359/360 |
| 2013/0260139 | A1 | 10/2013 | Kamada et al. |
| 2014/0063582 | A1 | 3/2014 | Gross et al. |
| 2014/0101919 | A1 | 4/2014 | Van Nutt et al. |

FOREIGN PATENT DOCUMENTS

| | | |
|---|---|---|
| TW | 201139313 A | 11/2011 |
| TW | 201226175 A | 7/2012 |
| WO | 2001021540 A | 3/2001 |
| WO | 2008/036358 A2 | 3/2008 |
| WO | 2008/036363 A2 | 3/2008 |
| WO | 2008/091385 A2 | 7/2008 |
| WO | 2011109306 A2 | 9/2011 |
| WO | 2014185518 A1 | 11/2014 |
| WO | 2015023137 A1 | 2/2015 |
| WO | 2016081896 A1 | 5/2016 |

OTHER PUBLICATIONS

International Search Report and Written Opinion for PCT Application No. PCT/US2015/049985, dated Dec. 11, 2015, 14 pages.
International Search Report for Application No. PCT/US2015/049985 dated Sep. 14, 2015 (one page).
International Search Report for PCT/US2015/061978, dated Mar. 2, 2016, 1 page.

* cited by examiner

OPTICAL FILM INCLUDING AN INFRARED ABSORPTION LAYER

CROSS-REFERENCE TO RELATED APPLICATION(S)

This application claims priority to French Application No. 1402044, filed Sep. 15, 2014, entitled "OPTICAL FILM INCLUDING AN INFRARED ABSORPTION LAYER," by Singh et al. Each patent application cited herein is hereby incorporated by reference in its entirety.

FIELD OF THE DISCLOSURE

The present disclosure relates to composite films, and more particularly to optically transparent composite films including an infrared absorption layer.

RELATED ART

Composites that absorb radiation in the infrared spectrum while transmitting radiation in the visible spectrum have important applications, for example as coverings applied to windows in building or vehicles.

For certain such composite films, visible light transmittance must be high. In the United States of America for example, automotive windshields must have a visible light transmittance of at least 70%. However, for conventional composite films, including an infrared absorption layer to exhibit low reflectivity and absorptivity of infrared radiation can also lower the visible light transmittance.

It has been desired to improve the optical and solar properties of composite films. However, attempts to improve solar properties, such as selectivity, continue to hinder other optical performance, such as the visible light transmittance, and vice versa.

Accordingly, a need exists to develop alternate materials for Infrared absorption that synergistically meet the needs of transparency, solar energy rejection, and thus selectivity.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the optical film arts.

The present disclosure is directed to, for example, improved infrared absorption in composite films. Moreover, certain embodiments are able to achieve desirable performances without the need for a silver layer. The concepts are better understood in view of the embodiments described below, which illustrate and do not limit the scope of the present invention.

Figure 1:
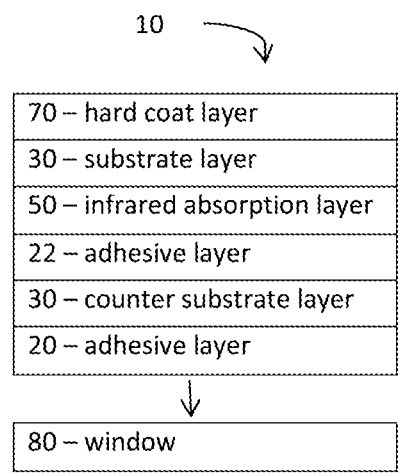
FIG. 1 includes an illustration of a composite film according to certain embodiments of the present disclosure.
Figure 2:
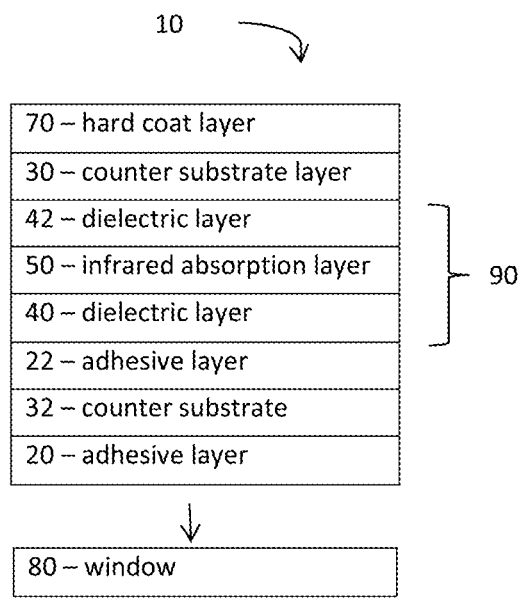
FIG. 2 includes an illustration of another composite film according to certain embodiments of the present disclosure.

FIGS. 1 and 2 illustrate representative cross sections of example composite film 10 according to certain embodiments. The composite film 10 can include a substrate layer 30; an adhesive layer 22; a first and second dielectric layer 40, 42 (see FIG. 2); an infrared absorption layer 50; and a counter substrate layer 32. It is to be understood that the composite film 10 illustrated in FIGS. 1 and 2 are illustrative embodiments. All of the layers shown are not required, and any number of additional layers, or less layers, or different arrangement of layers than shown can be within the scope of the present disclosure.

The substrate layer 30 and/or counter substrate layer 32 can be composed of any number of different materials as desired for the particular application. In certain embodiments, the substrate layer 30 and/or counter substrate layer 30 can be a transparent layer. The substrate layer 30 and/or counter substrate layer 30 can also be flexible. Suitable transparent materials include polycarbonate, polyacrylate, polyester, such as polyethylene terephthalate (PET) or polyethylene naphthalate (PEN), cellulose triacetated (TCA or TAC), polyurethane, fluoropolymers, or combinations thereof. In particular embodiments, the substrate layer 30 and/or counter substrate layer 30 can contain polyethylene terephthalate (PET). In other particular embodiments, the substrate layer 30 and/or counter substrate layer 32 can contain polyethylene naphthalate (PEN).

The thickness of the substrate layer 30 and/or counter substrate layer 30 can vary and the variations can depend on the material selected and the desired application. In certain embodiments, the substrate layer 30 and/or counter substrate layer 30 can have a thickness of at least about 0.1 micrometer, at least about 1 micrometer, or even at least about 10 micrometers. In further embodiments, the substrate layer 30 and/or counter substrate layer 30 can have a thickness of no greater than about 1000 micrometers, no greater than about 500 micrometers, no greater than about 100 micrometers, or even no greater than about 50 micrometers. Moreover, the substrate layer 30 and/or counter substrate layer 30 can have a thickness in a range of any of the maximum and minimum values described above, such as, from about 0.1 micrometers to about 1000 micrometers, from about 1 micrometer to about 100 micrometers, or even, from about 10 micrometers to about 50 micrometers.

In very particular embodiments, the thickness of the substrate layer 30 can be greater than the thickness of the counter substrate 22. For example, in very particular embodiments, a ratio of the thickness of the substrate layer 30 to the thickness of the counter substrate 22 can be at least 1, at least 1.5, at least 1.75, or even at least 2.

In certain embodiments, the composite film can be adapted to be applied to a rigid surface, such as a glass window. When used as a composite film for application to a rigid surface, such as a glass window, the substrate layer 30 can be adapted to be disposed adjacent a surface to be covered with the film. For example, as illustrated in FIG. 1, when attached to a window 80, the counter substrate layer 30 can be nearer the window than the infrared absorption layer. As such, the composite film can be a flexible, free-standing composite film which can be adapted to adhere to an architectural member or automotive member such as a glass window.

Moreover, as illustrated in FIG. 1, a first adhesive layer 20 can be disposed adjacent the counter substrate layer 30 and adapted to contact the surface to be covered (i.e. glass window) with the composite film 10. In certain embodiments, the first adhesive layer 20 can include a pressure sensitive adhesive (PSA).

In certain embodiments, the composite film 10 can include a hard coat layer 70 disposed adjacent to, and in particular, directly adjacent to the substrate layer 30. The hard coat layer 70 can provide improvement in abrasion resistance, so that the substrate layer 30 is less likely to be scratched. The hard coat layer 70 can include a cross-linked acrylate, an acrylate containing nanoparticles, such as $SiO_2$ or $Al_2O_3$, or any combination thereof. The hard coat layer 70 can have any desirable thickness, such as a thickness in a range of 1 micron to 5 microns.

Referring again to FIGS. 1 and 2, the composite film 10 can contain an infrared absorption layer 50. The infrared absorption layer 50 can provide the composite with the ability to absorb infrared radiation, and reduce the amount of heat that is transferred through the composite. As illustrated in FIG. 2, the infrared absorption layer 50 can be adjacent to or even directly contacting one or more dielectric layers 40, 42 which will be described in more detail below.

Further, in certain embodiments the composite film 10 can contain more than one infrared absorption layers. For example, in certain embodiments, a plurality of infrared absorption layers (i.e. a first infrared absorption layer 50 and a second infrared absorption layer 52) can be disposed adjacent to each other, such as directly adjacent to each other.

Figure 3:
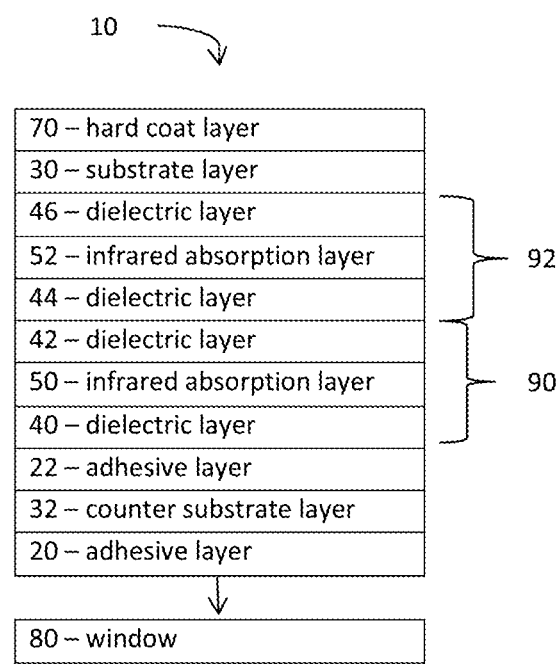
FIG. 3 includes an illustration of yet another composite film according to certain embodiments of the present disclosure.

In other embodiments, as particularly illustrated in FIG. 3, when two or more infrared absorption layers are present, each additional infrared absorption layer can have one or more dielectric layers that directly contacts the major surfaces of each infrared absorption layer. For example, as illustrated in FIG. 3, the second infrared absorption layer 52 can be in direct contact with a third dielectric layer 44 and a fourth dielectric layer 46. Further, the second infrared absorption layer 52 can be further from the substrate layer 30 than the first infrared absorption layer 50.

In certain embodiments, any of the one or more infrared absorption layers described above can contain an infrared absorption material that exhibits high absorptivity in the infrared region. The infrared absorption material can include an inorganic material, an oxide material, a metal oxide material, or a dielectric material. In particular, it is desirable that the infrared absorption material exhibits high transparency in the visible region. For example, the infrared absorption material can include a transparent conductive oxide (TCO). The infrared absorption material can have low conductivity, such as lower conductivity than a silver layer. The conductivity of silver layer can block electromagnetic waves. Alternatively, embodiments of the infrared absorption layer include an infrared absorption material having reduced conductivity can reduce or eliminate blockage of electromagnetic waves. Examples of the infrared absorption material that can be included in the infrared absorption layer include a zinc oxide, an indium oxide, a tin oxide, a cadmium oxide, or any combination thereof.

The infrared absorption material can include a substantially pure metal oxide or a metal oxide including impurities. The impurities can include a dopant. The dopant can improve infrared absorption by inducing a shift of the plasma wavelength toward a smaller wavelength responsible for infrared absorption. Examples of suitable dopants include aluminum, gallium, indium, tin, magnesium, antimony, fluorine, or any combination thereof. For example, suitable doped metal oxides that can be used as the infrared absorption material include aluminum-doped zinc oxide (AZO), indium-doped zinc oxide (IZO), gallium-doped zinc oxide (GZO), tin-doped indium oxide (ITO), antimony-doped tin oxide (ATO), fluorine-doped tin oxide (FTO), indium-gallium co-doped zinc oxide (IGZO), or any combination thereof. In very particular embodiments, the infrared absorption layer can include AZO, GZO, or both.

The amount of dopant included in the metal oxide can depend on the metal oxide being doped, the dopant being used, and the desired effect of the dopant. In general, if a dopant is used, the dopant can be present in the metal oxide in an amount of at least 0.05 wt %, at least 0.1 wt %, at least 0.5 wt %, or at least 1 wt %. However, too much dopant can diminish the effectiveness of the infrared absorption material. In certain embodiments, the dopant may be present in an amount no greater than 20 wt %, no greater than 17 wt %, or no greater than 15 wt %. For example, the dopant can be present in the metal oxide in a range of any of the above minimums and maximums, such as 0.05 to 20 wt %, 0.1 to 17 wt %, or 0.5 to 15 wt %. In a particular example, the infrared absorption material includes an AZO with an $Al_2O_3$ dopant concentration in a range of 0.1 to 6.5 wt % (corresponding to an Al concentration of up to 10 at %), a GZO with a dopant concentration in a range of 1 to 17.5 wt %

(corresponding to a Ga concentration of 15 at %), or both. The above values are based on the total weight of the metal oxide.

Any of the one or more infrared absorption layers 50, 52 can have a thickness of at least 50 nanometers (nm), at least 75 nm, at least 100 nm, or at least 150 nm. Furthermore, any of the one or more infrared absorption layers 50, 52 can have a thickness of no greater than about 1000 nm, no greater than 800 nm, no greater than 700 nm, no greater than 600 nm, or no greater than 500 nm. Moreover, any of the one or more infrared absorption layers 50, 52 can have a thickness in a range of any of the maximum and minimum values described above, such as from 50 to 1000 nm, from 75 to 800 nm, from 100 to 600 nm, or from 150 to 500 nm.

In particular embodiments, the second infrared absorption layer 52 can have a lesser or greater thickness than the first infrared absorption layer 50. For example, a ratio of the thickness of the second infrared absorption layer 52 to the thickness of the first Infrared absorption layer 50 can be at least about 0.25, at least about 0.5, at least about 0.75, at least about 1, at least about 1.5, at least about 2, or even at least about 3. In further embodiments, a ratio of the thickness of the second Infrared absorption layer 52 to the thickness of the first Infrared absorption layer 50 can be no greater than 10, no greater than 8, no greater than 5, no greater than 3, no greater than 2.5, or even no greater than 2. Moreover, a ratio of the thickness of the second Infrared absorption layer 52 to the thickness of the first Infrared absorption layer 50 can be in a range of any of the minimum and maximum values proved above, such as in the range of about 0.25 to about 3, or even about 1 to about 3.

In particular embodiments, the composite film 10 may contain no more than 3 infrared absorption layers, no more than 2 infrared absorption layers, or even no more than 1 infrared absorption layer. In very particular embodiments, the composite film 10 can contain no more than 2 infrared absorption layers.

The infrared absorption layer(s) can be formed by a vacuum deposition technique, for example, by sputtering or evaporation as is well understood in the art. In particular embodiments, the infrared absorption layer(s) can be formed by a magnetron sputtering technique. In such techniques, it is understood that the layers discussed above are substantially continuous layers of infrared absorption material, such as a continuous layer of atoms of the infrared absorption material. Such layers are distinct from infrared absorption particles dispersed within a coating formulation, which would not be a substantially continuous layer of an infrared absorption material as detailed in the present disclosure.

In further embodiments, the infrared absorption layer(s) can be formed by a chemical vapor deposition (CVD) technique. For example, in specific embodiments, the infrared absorption layer(s) can be formed from a plasma enhanced chemical vapor deposition technique (PECVD).

According to various embodiments of the disclosure, the composite can further contain one or more dielectric layers. Including a dielectric layer can further improve the optical properties of the composite film by acting as anti-reflectors allowing the infrared absorption layer to retain more of the infrared light.

As discussed above, in certain embodiment, one or more dielectric layer(s) can be disposed adjacent to, or even, directly contacting one or both major surfaces of an infrared absorption layer. For example, as illustrated in FIG. 2, in one embodiment, the composite film 10 can contain a first dielectric layer 40 and a second dielectric layer 42 with the infrared absorption layer 50 disposed therebetween.

In certain embodiments, the one or more dielectric layers can be composed of a dielectric material. The dielectric material can include, for example, an inorganic material, an oxide material, or a metal oxide material. Examples of a suitable dielectric material that can be used in the dielectric layer include a silicon nitride, an SiZrN, a silicon oxynitride (SiON), an aluminum oxide, a titanium oxide, a niobium oxide, a $BiO_2$, a PbO, a zinc oxide, a GZO, an AZO, an SnZnO, an MgZnO, an MgO, an $MoO_3$, or any combination thereof. In very particular embodiments, the one or more dielectric layers can be composed of a silicon nitride, a titanium oxide, a niobium oxide, or any combination thereof. There are some materials listed as suitable to be used in the dielectric layer and listed as suitable to be used in the infrared absorption layer. In certain embodiments, the dielectric material of the dielectric layer is different than the infrared absorption material of the infrared absorption layer.

The various metal oxides listed above can also be described in terms of their refractive index. In certain embodiments, the titanium oxide used can have a refractive index of from 1.4 to 2.55. In particular embodiments, the titanium oxide can be mainly composed of rutile phase and have a refractive index of about 2.41 at 510 nm. In another particular embodiment, the titanium oxide can be mainly composed of amorphous phase and have a refractive index of about 2.5 at 630 nm. In other embodiments, the $BiO_2$ used can have a refractive index of about 2.45 at 550 nm, the PbO used can have a refractive index of about 2.55 at 550 nm, the $Nb_2O_5$ used can have a refractive index of about 2.4 at 550 nm, and the ZnO used can have a refractive index of about 2.0 at 550 nm. In further embodiments, the metal oxide can have a refractive index of at least 1.0, such as at least 1.2, or even at least 1.4. In further embodiments, the metal oxide can have a refractive index of no greater than 3.0, such as no greater than 2.9, or even no greater than 2.7. In yet further embodiments, the metal oxide can have a refractive index in a range of any of the above minimum and maximum values, such as in a range of 1.0 to 3.0 or even 1.4 to 2.7. Alternatively, at least one of the metal oxides used as a layer in the one or more metal oxide based composite layer(s) can have a high refractive index, such as a refractive index of at least 2, at least 2.1, at least 2.2, at least 2.3, at least 2.4, or even at least 2.5 at either 510 nm or at 550 nm.

Any of the one or more dielectric layer(s) discussed herein can have a thickness of at least 25 nm, at least 35 nm, at least 45 nm, or at least 55 nm. Further, any of the one or more dielectric layer(s) can have a thickness of no greater than 200 nm, no greater than 175 nm, no greater than 150 nm, or even no greater than 125 nm. Moreover, any of the one or more dielectric layer(s) can have a thickness in a range of any of the maximum and minimum values described above, such as, from 25 to 200 nm, from 45 to 150 nm, or even from 50 nm to 125 nm.

Referring again to FIG. 2, in certain embodiments, the relative thickness of the first dielectric (nearer the substrate) and the second dielectric layer (further from the substrate) can be substantially the same, or they can be different. For example, a ratio of the thickness of the second dielectric layer to the first dielectric layer can be at least 0.25, at least 0.5, at least 1, at least 1.25, at least 1.5, at least 1.75, or even at least 2. In further embodiments, a ratio of the thickness of the second dielectric layer to the first dielectric layer can be no greater than 5, no greater than about 4, or even no greater than about 3. Moreover, in still further embodiments, a ratio of the thickness of the second dielectric layer to the first dielectric layer can be in a range of any of the minimum and maximum values provided above, such as in a range of 0.25 to 4, or even 1.25 to 3. In very particular embodiments, the second dielectric layer can have a greater thickness than the first dielectric layer.

The one or more dielectric layers can be formed by a vacuum deposition technique, for example, by sputtering or evaporation, or an atomic layer deposition technique. For example, the dielectric layers can be produced by DC magnetron sputtering using rotatable ceramic metal oxide targets. These targets can have enough electrical conductivity to be used as cathodes in a DC magnetron sputtering process.

The combination of an infrared absorption layer disposed between two dielectric layers is also referred to herein as a composite stack or an infrared absorption composite stack. Accordingly, in certain embodiments, the composite film can contain one or more infrared absorption composite stack(s). For example, referring to FIG. 2, the infrared absorption composite stack 90 includes the first dielectric layer 40, the infrared absorption layer 50, and the second dielectric layer 42. The infrared absorption composite stack can have a total thickness of at least 150 nm, at least 250 nm, at least 350 nm, or even at least 450 nm. Further, the infrared absorption composite stack 90 can have a total thickness of no greater than 1000 nm, no greater than 850 nm, no greater than 750 nm, or even no greater than 650 nm. Moreover, the infrared absorption composite stack 90 can have a total thickness in a range of any of the maximum and minimum values described above, such as from 250 nm to 850 nm, from 350 nm to 750 nm, or from 450 nm to 650 nm. In certain embodiments, as particularly illustrated in FIG. 3, the composite film can include more than one infrared absorption composite stack, such as the infrared absorption composite stack 90 and an additional infrared absorption composite stack 92. In such embodiments, any combination of dielectric layers and infrared absorption layers discussed above is contemplated within the scope of this disclosure.

The composite film 10, as a whole, including all layers disposed between and including the substrate layer 30 and the outermost layer, such as the hardcoat layer 70, can have a total thickness of at least about 25 micrometers, at least about 50 micrometers, at least about 60 micrometers, or even at least about 70 micrometers. Further, the composite film 10 can have a total thickness of no greater than about 300 micrometers, no greater than about 200 micrometers, no greater than about 100 micrometers, or even no greater than about 85 micrometers. Moreover, the composite film 10 can have a total thickness in a range of any of the maximum and minimum values described above, such as from about 25 micrometers to about 300 micrometers, or even from about 50 micrometers to about 100 micrometers.

Another aspect of the present disclosure is directed to a method of forming a composite film. For example, a method of forming a composite film can generally include: providing a substrate layer and depositing an infrared absorption layer on the substrate. The method could further include depositing a first dielectric layer on the substrate, depositing an infrared absorption layer on the first dielectric layer, and depositing a second dielectric layer on the infrared absorption layer. As discussed herein, deposition of any of the one or more dielectric layers and any of the one or more infrared absorption layers can be performed by an evaporation technique, such as magnetron sputtering, as is well understood in the art. The methods of forming the other layers, such as the adhesive layers and hard coat layer are also well understood in the art.

Conventional composite films for solar control by absorption that are deposited by magnetron sputtering on flexible substrates include a nitride, such as TiN, layer. However, such composites exhibit a relatively low visible light transmittance and selectivity. Silver layers have been incorporated into conventional composite films to improve these parameters. However, silver layers have a low stability, low durability, and poor moisture and weather resistance. Additionally, as stated previously, silver layers exhibit high conductivity that can block electromagnetic waves, which would be a drawback for mobile phone communication. Further, layers that can be added to the composite to combat the disadvantages of a thin silver layer generally negatively affect other properties such as visible light transmittance, haze, and yellowing. By contrast, as stated previously, the present disclosure describes a composite film that can exhibit high visible light transmittance and selectivity without the negative effects of adding a silver layer. In certain embodiments, the composite film can be essentially free of a silver layer, or even essentially free of a metal layer. Additionally, there exist composite films for solar control by absorption made by a wet-coating process. Such composite films include metal oxide nanoparticles, such as ITO or ATO, dispersed in a polymer matrix.

As stated previously, composite films made by a wet-coating process do not have a substantially continuous layer of infrared absorption material because, for example, the metal oxide nanoparticles are separated by the binder. In addition, composite films made by a wet-coating are applied to glass and annealed at a high temperature, such as 600° C., to improve the crystallinity of the metal oxide, which would improve, for example, its conductive properties. By contrast, the infrared absorption layer according to the present disclosure can be deposited on a substrate and, in certain embodiments, the substrate can include a plastic substrate. The higher annealing temperatures used with glass substrates cannot be performed on plastic substrates. Thus, in certain embodiments, the method according to the present disclosure includes annealing at a lower temperature, such as no greater than 300° C., no greater than 200° C., or even no greater than 175° C. In particular embodiments, the method does not include performing an annealing treatment on the infrared absorption layer.

In certain embodiments, the method can include varying the thickness of the infrared absorption layer to obtain a desired visible light transmittance and/or selectivity. Furthermore, the method can include varying the dopant concentration of the infrared absorption material to obtain a desired visual light transmittance and/or selectivity. It has heretofore been unknown how provide a composite film having a high visible light transmittance and high selectivity using magnetron sputtering on a plastic substrate without including a silver layer.

Particular advantages of the composite film will now be described in terms of its performance. Parameters include visual light transmittance, total solar energy rejection, light to solar gain ratio, visual light reflectance, and sheet resistivity.

Visible light transmittance (VLT), as used herein, refers to the percentage of the visible spectrum (380 to 780 nanometers) that is transmitted through a composite. VLT can be measured according to ISO 9050. In embodiments of the present disclosure, the composite can have a VLT of at least 55%, at least 60%, at least 65%, at least 70%, or at least 75%. Further, the composite can have a VLT of no greater than 100%, no greater than 95%, or no greater than 90%. Moreover, the composite can have a VLT in a range of any of the maximum and minimum values described above, such as in the range of from about 50 to 100%, 70 to 95%, or even 75 to 90%.

Total solar energy rejection (TSER) is a measurement of the total energy rejected by a composite and refers to the sum of the solar direct reflectance and the secondary heat transfer rejection factor towards the outside, the latter resulting from heat transfer by convection and longwave infrared-radiation of that part of the incident solar radiation which has been absorbed by the composite. The total solar energy rejection can be measured according to standard ISO 9050. A particular advantage of the present disclosure is the ability to obtain the TSER values described herein and illustrated in the Examples below, especially in combination with the other parameters described herein. In particular embodiments of the present disclosure, the composite can have a TSER of at least 10%, at least 12%, or at least 15%. Further, the composite can have a TSER of no greater than about 90%, no greater than about 80%, no greater than about 70%, no greater than about 60%, no greater than about 50%, no greater than about 40%, or even no greater than about 30%. Moreover, the composite can have a TSER in a range of any of the maximum and minimum values described above, such as from 10 to 90%, or even from 15 to 70%.

A particular advantage of the present disclosure is the ability to obtain the VLT values described herein and illustrated in the Examples below, especially in combination with the other parameters described herein, such as selectivity. Selectivity, as used herein, refers to the light to solar heat gain ratio (LSHGR), which is a measure of the relative efficiency of different composite types in selectively transmitting daylight while blocking heat gains. The higher the ratio, the brighter the room is without adding excessive amounts of heat. The light to solar heat gain ratio can be determined by the following equation:

$$LSHGR=(VLT)/(1-TSER)$$

where VLT is the visible light transmittance determined above, and TSER is the total solar energy rejection determined above. In particular embodiments of the present disclosure, the composite can have a light to solar gain ratio at least 0.3, at least 0.4, at least 0.5, at least 0.6, at least 0.7, at least 0.8, at least 0.9, at least 1.0, at least 1.02, or at least 1.03. Further, the composite can have a LSHGR of no greater than 2, no greater than 1.8, or even no greater than 1.4. Moreover, the composite can have a light to solar heat gain ratio in a range of any of the maximum and minimum values described above, such as from 0.8 to 1.8, or even 1.0 to 1.40.

Sheet resistance measures the electrical resistance of thin films that are nominally uniform in thickness. Commonly, electrical resistivity is presented in units such as $\Omega\cdot cm$. To obtain a sheet resistance value, electrical resistivity is divided by the sheet thickness, and the unit can be represented as $\Omega$. To avoid being misinterpreted as bulk resistance of 1 ohm, an alternate common unit for sheet resistance is "ohms per square" (denoted "$\Omega/sq$" or "$\Omega/\square$"), which is dimensionally equal to an ohm, but is exclusively used for sheet resistance.

In certain embodiments, the composite film can have a high sheet resistance, which denotes a low conductivity. A low conductivity is desired in certain embodiments of the composite films described herein, particularly when applied to an architectural or automotive member, such as a window. For example, if the conductivity of the window film is high, electronic communications, such as mobile phone communications, can be impaired or blocked. Accordingly, in certain embodiments, the composite film can have a sheet resistance of at least 5 Ohms/sq, at least 10 Ohms/sq, at least 25 Ohms/sq, at least 50 Ohms/sq, at least 100 Ohms/sq, at least 200 Ohms/sq, at least 300 Ohms/sq, at least 400 Ohms/sq, or even at least 500 Ohms/sq. In further embodiments, the composite film can have a sheet resistance of no greater than 3000 Ohms/sq, no greater than 2000 Ohms/sq, or even no greater than 1500 Ohms/sq. Moreover, the composite film can have a sheet resistance in a range of any of the maximum and minimum values described above, such as in the range of from 5 Ohms/sq to 2000 Ohms/sq, or from 50 Ohms/sq to 1500 Ohms/sq.

As discussed above, the sheet resistance of the composite film can be proportionally related to the thickness of the IR absorption layer. In other words, in certain embodiments, the sheet resistance of the composite film can tend to decrease as the thickness of the IR absorption layer increases.

The present disclosure represents a departure from the state of the art. For example, the infrared absorption composite films described above can demonstrate a synergistic improvement in the combination of VLT and TSER, and thus improved selectivity, also known as the light to solar heat gain ratio (LSHGR). In certain embodiments of this disclosure, the present inventors surprisingly discovered that incorporating a specific infrared absorption material in an infrared absorption layer discussed herein, particularly when sandwiched by particular dielectric layers discussed herein, resulted in a synergistic improvement in the optical and solar properties of the composite stacks, and in particular with respect to composites formed by magnetron sputtering on plastic substrates.

EXAMPLES

For each of the films, Samples A-E, the layers were deposited on a PET substrate by roll-to-roll (R2R) magnetron deposition with ceramic rotative targets for oxide materials, according to the parameters set forth in Table 1.

TABLE 1

| Layer | Target | Pressure (μbar) | Power (kW) | Gas | Quantity of Gas (sccm) |
|---|---|---|---|---|---|
| AZO | $ZnO:Al_2O_3$ 2% wt | 2 | 1.3 | Ar | 40 (Ar) |
| GZO | $ZnO:Ga_2O_3$ 4.5% wt | 8 | 1 | $Ar + O_2$ | 200 (Ar); 6 $(Ar + O_2)$ |
| TiO | $TiO_x$ | 2 | 2 | $Ar + O_2$ | 20 (Ar); 3 $(O_2)$ |
| NbO | $Nb_2Ox$ | 0.75 | 2 | $Ar + O_2$ | 15 (Ar); 14 $(Ar + O_2)$ |

For each sample, the PET substrate had a thickness of 50 micrometers. The order, composition, and thickness of the layers deposited on the substrate are set forth in Table 2 below. As shown in Table 2, Samples B, D, and E included dielectric layers and Samples A, C, and F did not. For Samples B, D, and E, the infrared absorption layer was deposited after the first dielectric layer and before the second dielectric layer to form a sample composite stack with the following order of layers: substrate/first dielectric layer/infrared absorption layer/second dielectric layer. For Samples A, C, and F, the sample composite stack had the following order of layers: substrate/infrared absorption layer.

TABLE 2

| Sample | First Dielectric Layer | | Infrared Absorption Layer | | | Second Dielectric Layer | |
|---|---|---|---|---|---|---|---|
| | Material | Thickness (nm) | Material | Dopant Conc. (%) | Thickness (nm) | Material | Thickness (nm) |
| A | — | — | AZO | (Al$_2$O$_3$) 2% | 566 | — | — |
| B | NbO | 100 | AZO | (Al$_2$O$_3$) 2% | 566 | NbO | 100 |
| C | — | — | GZO | (Ga$_2$O$_3$) 4.5% | 154 | — | — |
| D | NbO | 75 | GZO | (Ga$_2$O$_3$) 4.5% | 154 | NbO | 75 |
| E | TiO | 105 | GZO | (Ga$_2$O$_3$) 4.5% | 250 | TiO | 105 |
| F | — | — | GZO | (Ga$_2$O$_3$) 4.5% | 385 | — | — |

The samples were tested for the properties in the context of a solar control film by the methods described above. It is noted that the samples did not include a counter substrate and were not adhered to a glass window. The results of the tests are reported below in Table 3.

TABLE 3

| Sample | VLT (%) | TSER (%) | LSHGR |
|---|---|---|---|
| A | 80.86 | 22.31 | 1.04 |
| B | 76.05 | 31.6 | 1.11 |
| C | 88.57 | 15.64 | 1.08 |
| D | 82.49 | 27.83 | 1.14 |
| E | 83.80 | 28.57 | 1.17 |
| F | 84.28 | 21.62 | 1.08 |

The results in Table 3 show that the composite film according to this disclosure has a surprisingly high TSER for a VLT greater than 75%. In addition, selectivity is improved by addition of the dielectric layers.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A composite solar control film comprising:
a substrate; and
an infrared absorption layer disposed over the substrate, the infrared absorption stack comprising an infrared absorption layer having a thickness of at least 80 nm, the infrared absorption layer comprising a continuous layer of transparent conductive oxide,
wherein the composite solar control film has a selectivity of at least 1.0 at a VLT of greater than 65%.

Item 2. A composite solar control film comprising:
a substrate; and
an infrared absorption layer disposed over the substrate, the infrared absorption stack comprising an infrared absorption layer comprising a continuous layer of transparent conductive oxide,
wherein the composite solar control film is essentially free of a silver metal layer and has a selectivity of at least 1.0 at a VLT of greater than 65%.

Item 3. The composite solar control film of items 1 or 2, wherein:
the infrared absorption layer has a first major surface and a second major surface; and
the composite solar control film comprises an infrared absorption composite stack including the infrared absorption layer, a first dielectric layer disposed over the first major surface of the infrared absorption layer, and a second dielectric layer disposed over the second major surface of the infrared absorption layer.

Item 4. A method of making a composite solar control film, comprising:
providing a flexible substrate; and
depositing an infrared absorption layer over the first dielectric layer, the infrared absorption layer comprising a layer of continuous transparent conductive oxide,
wherein the composite solar control film has a selectivity of at least 1.0 at a VLT of greater than 75%, and
wherein the infrared absorption layer has a thickness of at least 125 nm, the composite solar film is essentially free of a silver metal layer, or both.

Item 5. The method of item 4, further comprising depositing a first dielectric layer between the substrate and the infrared absorption layer, and depositing a second dielectric layer over the infrared absorption layer, to form an infrared absorption composite stack comprising the infrared absorption layer and the first and second dielectric layers.

Item 6. The method of any one of items 4 and 5, wherein the method includes an annealing treatment at a temperature of no greater than 180° C.

Item 7. The method of any one of items 4 and 5, wherein the infrared absorption layer does not undergo an annealing treatment.

Item 8. The composite or method of any one of the preceding items, wherein the composite solar control film is essentially free of a layer comprising an essentially pure metal or a metal alloy.

Item 9. The composite or method of any one of the preceding items, wherein the composite solar control film is essentially free of a layer comprising essentially pure metal or a metal alloy including gold, titanium, aluminum, platinum, palladium, copper, indium, zinc and combinations thereof.

Item 10. The composite or method of any one of the preceding items comprising a transparent substrate layer comprising a polymer.

Item 11. The composite or method of any one of the preceding items, wherein the transparent substrate layer comprises polycarbonate, polyacrylate, polyester, cellulose triacetated (TCA or TAC), polyurethane, or combinations thereof.

Item 12. The composite or method of any one of the preceding items, wherein the transparent substrate layer comprises polyethylene terephthalate (PET) or polyethylene-naphtalate (PEN).

Item 13. The composite or method of any one of the preceding items, wherein the transparent substrate layer has a thickness of at least about 0.1 micrometers, at least about 1 micrometer, or even at least about 10 micrometers; a thickness of no greater than about 1000 micrometers, no greater than about 500 micrometers, no greater than about 100 micrometers, or even no greater than about 50 micrometers; or a thickness in a range of about 0.1 micrometers to about 1000 micrometers or even in a range of about 10 micrometers to about 50 micrometers.

Item 14. The composite or method of any one of the preceding items further comprising a transparent counter substrate.

Item 15. The composite or method of any one of the preceding items, further comprising a counter substrate, wherein the infrared absorption layer or infrared absorption composite stack is sandwiched between the substrate layer and the counter substrate layer.

Item 16. The composite or method of any one of the preceding items, wherein the transparent counter substrate layer comprises polycarbonate, polyacrylate, polyester, cellulose triacetated (TCA or TAC), polyurethane, or combinations thereof.

Item 17. The composite or method of any one of the preceding items, wherein the transparent counter substrate layer comprises polyethylene terephthalate (PET) or polyethylene-naphtalate (PEN).

Item 18. The composite or method of any one of the preceding items, wherein the transparent substrate layer has a thickness of at least about 0.1 micrometers, at least about 1 micrometer, or even at least about 10 micrometers; a thickness of no greater than about 1000 micrometers, no greater than about 500 micrometers, no greater than about 100 micrometers, or even no greater than about 50 micrometers; or a thickness in a range of about 0.1 micrometers to about 1000 micrometers or even in a range of about 10 micrometers to about 50 micrometers.

Item 19. The composite or method of any one of the preceding items, wherein the composite film is adapted for application to a rigid surface, such as a glass window.

Item 20. The composite or method of item 19, wherein the infrared absorption layer is nearer the window than the substrate layer.

Item 21. The composite or method of items 19 or 20, wherein the composite film is a flexible, free-standing composite film adapted to adhere to an architectural member or automotive member such as a glass window.

Item 22. The composite or method of any one of the preceding items, wherein the composite film includes an adhesive layer.

Item 23. The composite method of item 22, wherein the adhesive layer is disposed adjacent the substrate layer and adapted to contact a surface to be covered, such as a glass window.

Item 24. The composite or method of items 22 or 23, wherein the adhesive layer includes a pressure sensitive adhesive (PSA).

Item 25. The composite or method of any one of the preceding items, wherein the composite film includes a hard coat layer disposed adjacent to, and in particular directly adjacent to, a counter substrate layer.

Item 26. The composite or method of item 25, wherein the hard coat layer includes a cross-linked acrylate, an acrylate containing nanoparticles, such as $SiO_2$ or $Al_2O_3$, or any combination thereof.

Item 27. The composite or method of items 25 or 26, wherein the hard coat layer has a thickness in a range of 1 micron to 5 microns.

Item 28. The composite or method of any one of the preceding items, wherein the infrared absorption layer is disposed directly adjacent to the first and second dielectric layers.

Item 29. The composite or method of any one of the preceding items, wherein the infrared absorption layer is contacting the first and second dielectric layers.

Item 30. The composite or method of any one of the preceding items, wherein the infrared absorption layer includes an inorganic material, an oxide, a metal oxide, or a dielectric compound.

Item 31. The composite or method of any one of the preceding items, wherein the infrared absorption layer includes a transparent conductive oxide.

Item 32. The composite or method of any one of the preceding items, wherein the transparent conductive oxide of the infrared absorption layer includes a zinc oxide, an indium oxide, a tin oxide, a cadmium oxide, or any combination thereof.

Item 33. The composite or method of any one of the preceding items, wherein the transparent conductive oxide of the infrared absorption layer includes an aluminum-doped zinc oxide (AZO), a gallium-doped zinc oxide (GZO), a tin-doped indium oxide (ITO), an antimony-doped tin oxide (ATO), a fluorine-doped tin oxide (FTO), an indium-doped zinc oxide (IZO), an indium-gallium co-doped zinc oxide, or any combination thereof.

Item 34. The composite or method of any one of the preceding items, wherein the infrared absorption layer includes AZO, GZO, or both.

Item 35. The composite or method of any one of the preceding items, wherein transparent conductive oxide of the infrared absorption layer includes a dopant an amount of at least at least 0.05 wt %, at least 0.1 wt %, at least 0.5 wt %, or at least 1 wt %.

Item 36. The composite or method of any one of the preceding items, wherein transparent conductive oxide of the infrared absorption layer includes a dopant an amount of no greater than 20 wt %, no greater than 17 wt %, or no greater than 15 wt %.

Item 37. The composite or method of any one of the preceding items, wherein the transparent conductive oxide of the infrared absorption layer includes a dopant in an amount in a range of 0.05 to 20 wt %, 0.1 to 17 wt %, or 0.5 to 15 wt %.

Item 38. The composite or method of any one of the preceding items, wherein the transparent metal oxide of the infrared absorption layer includes AZO with a dopant concentration in a range of 0.1 to 6.5 wt %, a GZO with a dopant concentration in a range of 1 to 17.5 wt %, or both.

Item 39. The composite or method of any one of the preceding items, wherein the infrared absorption layer has a thickness of at least 50 nm, at least 75 nm, at least 100 nm, or at least 150 nm.

Item 40. The composite or method of any one of the preceding items, wherein the infrared absorption layer has a thickness of no greater than about 1000 nm, no greater than 800 nm, no greater than 700 nm, no greater than 600 nm, or no greater than 500 nm.

Item 41. The composite or method of any one of the preceding items, wherein the infrared absorption layer has a thickness in a range of any of 50 to 1000 nm, 75 to 800 nm, 100 to 600 nm, or 150 to 500 nm.

Item 42. The composite or method of any one of the preceding items, wherein the composite film contains no more than 3 infrared absorption layers, no more than 2 infrared absorption layers, or no more than 1 infrared absorption layer.

Item 43. The composite or method of any one of the preceding items, wherein the dielectric layers of the infrared absorption composite stack includes an inorganic material, an oxide, or a metal oxide.

Item 44. The composite or method of any one of the preceding items, wherein the dielectric layers of the infrared absorption composite stack include a silicon nitride, an SiZrN, a silicon oxynitride (SiON), an aluminum oxide, a titanium oxide, a niobium oxide, a $BiO_2$, a PbO, a zinc oxide, a GZO, an AZO, an SnZnO, an MgZnO, an MgO, an $MoO_3$, or any combination thereof.

Item 45. The composite or method of any one of the preceding items, wherein the dielectric layers of the infrared absorption composite stack include a titanium oxide, a niobium oxide, an SiON, or a silicon nitride, or any combination thereof.

Item 46. The composite or method of any one of the preceding items, wherein the dielectric layers of the infrared absorption composite stack each have a thickness of at least 25 nm, at least 35 nm, at least 45 nm, or at least 55 nm.

Item 47. The composite or method of any one of the preceding items, wherein the dielectric layers of the infrared absorption composite stack each have a thickness of no greater than 200 nm, no greater than 175 nm, no greater than 150 nm, or no greater than 125 nm.

Item 48. The composite or method of any one of the preceding items, wherein the dielectric layers of the infrared absorption composite stack each have a thickness in a range from 25 to 200 nm, from 45 to 150 nm, or from 50 nm to 125 nm.

Item 49. The composite or method of any one of the preceding items, wherein the composite comprises a plurality of infrared absorption composite stacks each including an infrared absorption layer.

Item 50. The composite or method of any one of the preceding items, wherein the composite film has a total thickness of at least 25 micrometers, at least 50 micrometers, at least 60 micrometers, or at least 70 micrometers.

Item 51. The composite or method of any one of the preceding items, wherein the composite film has a total thickness of no greater than 300 micrometers, no greater than 200 micrometers, no greater than 100 micrometers, or no greater than 85 micrometers.

Item 52. The composite or method of any one of the preceding items, wherein the composite film has a total thickness in a range of 25 to 300 micrometers, or 50 to 100 micrometers.

Item 53. The composite or method of any one of the preceding items, wherein any of the one or more IR absorption composite stacks is essentially free of a silver layer.

Item 54. The composite or method of any one of the preceding items, wherein the composite film is essentially free of a silver layer.

Item 55. The composite or method of any one of the preceding items, wherein any solar control layer is essentially free of a silver layer.

Item 56. The composite or method of any one of the preceding items, wherein any one of one or more the infrared absorption layer and/or one or more dielectric layers is a continuous layer.

Item 57. The composite or method of any one of the preceding items, wherein any one of one or more the infrared absorption layer and/or one or more dielectric layers is formed by an evaporation technique.

Item 58. The composite film of any one of the preceding items, wherein any one of one or more the infrared absorption layer and/or one or more dielectric layers is formed by a sputtering technique.

Item 59. The method of any one of the preceding items, wherein the deposition of any of the one or more dielectric layers and any of the one or more infrared absorption layers can be performed by an evaporation technique, such as magnetron sputtering.

Item 60. The method of any one of the preceding items, wherein the deposition of the infrared absorption layer is not performed by a wet-coating method.

Item 61. The composite or method of any one of the preceding items, wherein the composite film has a VLT, measured according to ISO 9050, of at least 55%, at least 60%, at least 65%, at least 70%, or at least 75%.

Item 62. The composite or method of any one of the preceding items, wherein the composite film has a VLT, measured according to ISO 9050, of no greater than 100%, no greater than 95%, or no greater than 90%.

Item 63. The composite or method of any one of the preceding items, wherein the composite film has a VLT, measured according to ISO 9050, in the range of from about 50 to 100%, 70 to 95%, or even 75 to 90%.

Item 64. The composite or method of any one of the preceding items, wherein the composite film has a TSER, measured according to ISO 9050, of at least 10%, at least 12%, or at least 15%.

Item 65. The composite or method of any one of the preceding items, wherein the composite has a TSER of no greater than about 90%, no greater than about 80%, no greater than about 70%, no greater than about 60%, no greater than about 50%, no greater than about 40%, or no greater than about 30%.

Item 66. The composite or method of any one of the preceding items, wherein composite film has a TSER, measured according to ISO 9050, in a range of 10 to 90%, or 15 to 70%.

Item 67. The composite or method of any one of the preceding items, wherein the light to solar heat gain ratio (LSHGR), determined by the equation LSHGR=(VLT)/(1−TSER), of at least 0.3, at least 0.4, at least 0.5, at least 0.6, at least 0.7, at least 08, at least 0.9, at least 1.0, at least 1.02, or at least 1.03.

Item 68. The composite or method of any one of the preceding items, wherein the light to solar heat gain ratio (LSHGR), determined by the equation LSHGR=(VLT)/(1−TSER), of no greater than 2, no greater than 1.8, or no greater than 1.4.

Item 69. The composite or method of any one of the preceding items, wherein the composite film has a sheet resistance of at least 200 Ohms/sq, at least 300 Ohms/sq, at least 400 Ohms/sq, or even at least 500 Ohms/sq.

Item 70. The composite or method of any one of the preceding items, wherein the composite film has a sheet resistance of no greater than 3000 Ohms/sq, no greater than 2000 Ohms/sq, or even no greater than 1500 Ohms/sq.

Item 71. The composite or method of any one of the preceding items, wherein the composite film has a sheet resistance in a range of 200 Ohms/sq to 2000 Ohms/sq, or from 300 Ohms/sq to 1500 Ohms/sq.

Item 72. A window comprising a transparent panel and the composite of any one of the preceding items adhered to the transparent panel.

Item 73. An architectural member or an automotive member comprising a transparent panel and the composite of any one of the preceding items adhered to the transparent panel.

Item 74. The composite or method of any one of the preceding items, wherein one or more of the infrared absorption layer(s) are formed from a plasma enhanced chemical vapor deposition technique (PECVD).

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite solar control film comprising:
   a substrate; and
   an infrared absorption stack disposed over the substrate, the infrared absorption stack comprising an infrared absorption layer having a thickness of at least 80 nm, the infrared absorption layer comprising a continuous layer of transparent conductive oxide,
   wherein the continuous layer of transparent conductive oxide comprises a doped metal oxide;
   wherein a dopant of the doped metal oxide comprises aluminum, gallium, indium, tin, magnesium, antimony, fluorine, or any combination thereof;
   wherein the dopant is present in the metal oxide in an amount of at least 0.05 wt. % and no greater than 20 wt. % based on a total weight of the metal oxide; and
   wherein the composite solar control film has a selectivity of at least 1.0 at a VLT of greater than 65%.

2. The composite solar control film of claim 1, wherein the infrared absorption layer includes an inorganic material, an oxide, a metal oxide, or a dielectric compound.

3. The composite solar control film of claim 1, wherein the composite solar control film is essentially free of a layer comprising an essentially pure metal or a metal alloy.

4. The composite solar control film of claim 1, wherein the infrared absorption layer includes a transparent conductive oxide.

5. The composite solar control film of claim 1, wherein the infrared absorption layer includes an AZO, a GZO, or both.

6. The composite solar control film of claim 1, wherein:
   the infrared absorption layer has a first major surface and a second major surface; and
   the infrared absorption composite stack further comprises a first dielectric layer disposed over the first major surface of the infrared absorption layer, and a second dielectric layer disposed over the second major surface of the infrared absorption layer.

7. The composite solar control film of claim 6, wherein the dielectric layers of the infrared absorption composite stack include a silicon nitride, an SiZrN, a silicon oxynitride (SiON), an aluminum oxide, a titanium oxide, a niobium oxide, a $BiO_2$, a PbO, a zinc oxide, a GZO, an AZO, an SnZnO, an MgZnO, an MgO, an $MoO_3$, or any combination thereof.

8. The composite solar control film of claim 6, wherein the dielectric layers of the infrared absorption composite stack include a titanium oxide, a niobium oxide, an SiON, or a silicon nitride, or any combination thereof.

9. The composite solar control film of claim 6, wherein the infrared absorption layer is disposed directly adjacent to the first and second dielectric layers.

10. The composite solar control film of claim 1, wherein the substrate comprises a transparent substrate layer comprising a polymer.

11. The composite solar control film of claim 1, wherein the composite film is a flexible, free-standing composite film adapted to adhere to an architectural member or automotive member such as a glass window.

12. The composite solar control film of claim 1, wherein the composite film has a TSER, measured according to ISO 9050, of at least 10%.

13. The composite solar control film of claim 1, wherein the composite film has a sheet resistance of at least 200 Ohms/sq.

14. A composite solar control film comprising:
   a substrate; and
   an infrared absorption layer disposed over the substrate, the infrared absorption stack comprising an infrared absorption layer comprising a continuous layer of transparent conductive oxide,
   wherein the continuous layer of transparent conductive oxide comprises a doped metal oxide;
   wherein a dopant of the doped metal oxide comprises aluminum, gallium, indium, tin, magnesium, antimony, fluorine, or any combination thereof;
   wherein the dopant is present in the metal oxide in an amount of at least 0.05 wt. % and no greater than 20 wt. % based on a total weight of the metal oxide, and
   wherein the composite solar control film is essentially free of a silver metal layer and has a selectivity of at least 1.0 at a VLT of greater than 65%.

15. The composite solar control film of claim 14, wherein:
   the infrared absorption layer has a first major surface and a second major surface; and
   the composite solar control film comprises an infrared absorption composite stack including the infrared absorption layer, a first dielectric layer disposed over the first major surface of the infrared absorption layer, and a second dielectric layer disposed over the second major surface of the infrared absorption layer.

16. The composite solar control film of claim 14, wherein the infrared absorption layer has a thickness of at least 80 nm.

17. A method of making a composite solar control film, comprising:
   providing a flexible substrate; and
   depositing an infrared absorption layer over a first dielectric layer, the infrared absorption layer comprising a layer of continuous transparent conductive oxide,
   wherein the layer of continuous transparent conductive oxide comprises a doped metal oxide,
   wherein a dopant of the doped metal oxide comprises aluminum, gallium, indium, tin, magnesium, antimony, fluorine, or any combination thereof,
   wherein the dopant is present in the metal oxide in an amount of at least 0.05 wt. % and no greater than 20 wt. % based on a total weight of the metal oxide, wherein the composite solar control film has a selectivity of at least 1.0 at a VLT of greater than 75%, and wherein the infrared absorption layer has a thickness of at least 125 nm, the composite solar film is essentially free of a silver metal layer, or both.

18. The method of claim 17, wherein one or more of the infrared absorption layer(s) are formed from a plasma enhanced chemical vapor deposition technique (PECVD).

* * * * *